United States Patent [19]

Douine et al.

[11] Patent Number: 5,827,964
[45] Date of Patent: Oct. 27, 1998

[54] DEVICE FOR THE DETECTION AND MEASUREMENT OF A POSITION ON A TURNING BODY, AND MACHINE FOR BALANCING A TURNING BODY

[75] Inventors: Denis Douine, Lagny sur Marne; Patrice Muller, Chartres, both of France

[73] Assignee: Muller BEM, Chartres, France

[21] Appl. No.: 589,243

[22] Filed: Jan. 23, 1996

[30] Foreign Application Priority Data

Jan. 27, 1995 [FR] France .................................. 95 00947

[51] Int. Cl.⁶ ..................................................... G01M 1/16
[52] U.S. Cl. ........................ 73/466; 356/139.09; 364/463
[58] Field of Search .............................. 73/462, 466, 467, 73/66, 487, 460; 356/139.09, 155, 3.12, 4.03; 301/5.21, 5.22; 968/761; 33/203; 364/463

[56] References Cited

U.S. PATENT DOCUMENTS

| | | | |
|---|---|---|---|
| 3,675,495 | 7/1972 | MacMillan | 73/466 |
| 3,686,955 | 8/1972 | Butler | 73/457 |
| 3,910,121 | 10/1975 | Curchod et al. | 73/462 |
| 4,277,976 | 7/1981 | Mueller et al. | 73/457 |
| 4,377,946 | 3/1983 | Donato | 73/457 |
| 4,499,768 | 2/1985 | Madden et al. | 73/462 |
| 4,501,095 | 2/1985 | Drinkuth et al. | 451/5 |
| 4,502,328 | 3/1985 | Wood et al. | 73/462 |
| 4,945,763 | 8/1990 | Mueller | 73/462 |
| 5,054,918 | 10/1991 | Downing et al. | 356/152 |
| 5,291,273 | 3/1994 | Gelbart | 356/384 |

FOREIGN PATENT DOCUMENTS

| | | |
|---|---|---|
| 0 565 320 | 10/1993 | European Pat. Off. . |
| 1 112 659 | 8/1961 | Germany . |
| 41 01 921 | 8/1991 | Germany . |

OTHER PUBLICATIONS

Electronic Engineer's Reference Book, Sixth Edition, Edited by F F Mazda, Chapter 23, p. 12, 1989.

Primary Examiner—Hezron E. Williams
Assistant Examiner—Richard A. Moller
Attorney, Agent, or Firm—Young & Thompson

[57] ABSTRACT

A device for the detection and measurement of the position of a turning body (3) such as a wheel of an automotive vehicle, adapted to be driven in rotation, comprises a source of illumination (8) adapted to illuminate selectively the vicinity of the position to be detected and at least one detector (9) of the luminous intensity receiving the radiation of the illuminated position so as to determine the geometric parameter representative of the position (15) to be detected. Use in balancing turning bodies, particularly automotive vehicle wheels.

5 Claims, 3 Drawing Sheets

DEVICE FOR THE DETECTION AND MEASUREMENT OF A POSITION ON A TURNING BODY, AND MACHINE FOR BALANCING A TURNING BODY

FIELD OF THE INVENTION

The invention relates to a device for the detection and measurement of a position on a turning body, particularly on an automotive vehicle wheel adapted to be driven in rotation.

The invention also relates to a vehicle wheel balancing machine comprising such a device.

BACKGROUND OF THE INVENTION

U.S. Pat. No. 5,189,912 discloses an apparatus for ultrasonic measurement, as well as a wheel balancing machine comprising such an apparatus. The apparatus detects the radius of a wheel rim and the distances separating respectively the internal and external surfaces of the wheel rim from a reference plane. A frame mounted pivotally so as to overlap the wheel to be balanced carries a pair of ultrasonic transducers, so as to effect the measurements during pivoting of the frame between a position outside the wheel and a position of maximum overlap of the wheel. The measurements picked up are memorized and processed to determine the radius of the rim and the desired distances.

European application EP 0 565 320 discloses a process and device to detect the parameters of a wheel in a wheel balancer. In this process, a laser plane or surface is projected so as to form an image on the wheel, particularly at the junction of the rim and the tire. The intersection of the laser plane or surface and the wheel is observed and the shape of the intersection is determined by computation, so as to locate the edge of the rim, in the case in which this rim edge has a free edge corresponding to a free discontinuity of the calculated contour curve.

SUMMARY OF THE INVENTION

This device is generally satisfactory, but is applicable principally to steel wheel rims having a pronounced flange. This device requires however the use of a two-dimensional matrix optical detector and a complicated device for electronic processing using algorithms for complex calculations relying on differentiation, linear extrapolation and comparison of extrapolated values to the values obtained after reading actual measurements.

U.S. Pat. No. 5,054,918 relates to a dynamic wheel balancing device in which the incidence of a flat luminous beam directed toward the wheel from a known direction is detected, and in which a geometric Mortensen modelization is used for the transformation of the coordinates from obtained measurements by means of a bidimensional matrix of light detection cells.

French patent FR 2,679,031 discloses an automotive vehicle wheel balancing machine, in which an exploration device serves to determine the distance from one or several balancing planes relative to the machine and a balancing radius. To this end, the device comprises an exploration element which can be deployed to the desired balancing position and sending electrical output signals to an evaluation device, so as to determine with precision the angular position and the length of deployment of the exploration element.

This device is generally satisfactory, but comprises movable members requiring high precision machining which is expensive.

The invention has for its object to overcome the drawbacks of the known art, by providing a new essentially static device, simple to make and to assemble, comprising no movable mechanical member whose production world be costly.

The invention has for its object a device for the detection and measurement of a position on a turning body, so as to balance an automotive vehicle wheel adapted to be driven in rotation, comprising in combination: illumination means, at least one detector for the intensity of illumination receiving the radiation from an illuminated position, characterized in that the illumination means is arranged to illuminate selectively at least the vicinity of the position to be detected, so as to create a source of luminous radiation on the position to be detected, and in that the luminous intensity detector means is constituted by a chamber comprising an inlet surface provided with image definition means on a linear optical detector receiving the radiation from the illuminated position, so as to determine a geometric parameter representative of the position to be detected.

Thus, because of this selective illumination of the vicinity of the position to be detected, the invention provides a detection and measuring means applicable even to turning bodies having less defined contours such as wheels comprising light alloy rims.

According to other characteristics of the invention:
- the illumination means is adapted to produce a light beam comprised by substantially parallel rays,
- the device comprises at least one luminous source with a conical opening,
- the illumination means is a substantially punctual source of illumination disposed in immediate proximity to the position to be detected,
- each projector of luminous intensity comprises a means to focus or define an image on a linear optical detector, particularly on a detector of the CCD type,
- the position to be detected is a curve substantially coaxial to the axis of rotation of the turning body,
- the illumination means comprises means for gripping and positioning a balancing weight,
- the device has a U-shaped configuration (FIG. 1) enclosing at least partially the turning body to be balanced,
- the device comprises means for withdrawing the illumination means and the luminous intensity detection means to avoid projected debris,
- the device is programmable and comprises a program effecting the mean of the detected signals during the rotation of the turning body, so as to eliminate structural anomalies of the turning body,
- the programmable device comprises a correlation program, so as to verify the reproduceability of the signals during one rotation of the wheel,
- the programmable device comprises a valve detection program, during rotation of the wheel, Preferably, the programmable device comprises a correlation program, so as to verify the reproducibility of the signals during one rotation of the wheel.

The invention also has for its object a vehicle wheel balancing machine comprising a device according to the invention, in particular a vehicle wheel balancing machine comprising a chassis having a U-shaped configuration, or alternatively, a chassis comprising two parts pivoting relative to each other, which grip the wheel to be measured during execution of the measurement operation.

BRIEF DESCRIPTION OF THE DRAWINGS

The invention will be better understood thanks to the following description given by way of non-limiting example, with reference to the accompanying drawings, in which.

DETAILED DESCRIPTION OF THE INVENTION

Figures 1, 2:
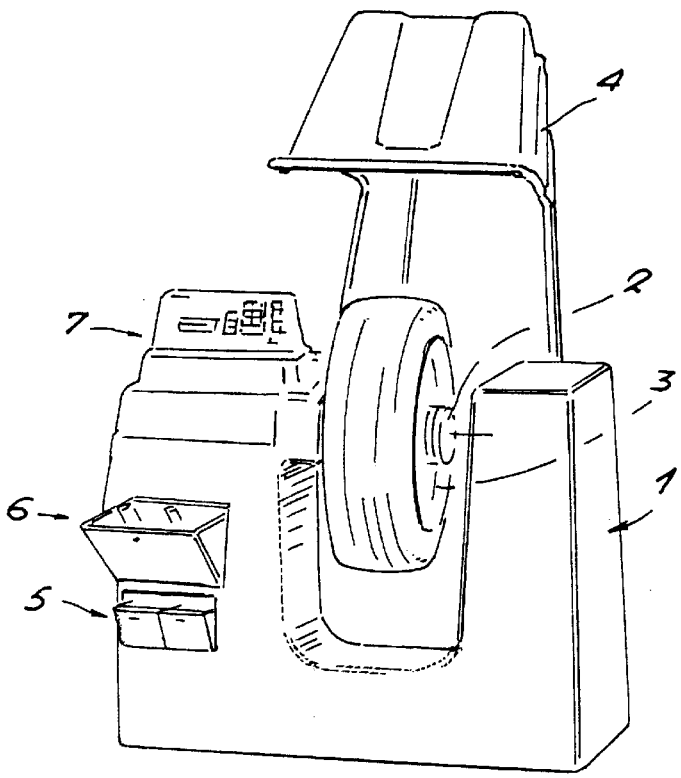
FIG. 1 shows schematically a perspective view of a balancing machine according to the invention.
FIG. 2 shows schematically a simplified view in radial cross section of a device according to the invention.

Referring to FIG. 1, a balancing machine according to the invention comprises a housing 1 supporting a rotatable shaft 2 on which is mounted a wheel 3 to be balanced, by means of a cone mounting of a type known per se. The wheel 3 is driven in rotation manually or by an electric motor driving by means of a pulley and belt transmission the rotatable shaft 2, a protective hood 4 being provided to avoid any undesirable or dangerous projections during rotation of the wheel to be driven.

The housing 1 is provided with cases 5 for balancing weights, with separating compartments 6 carrying wheel-mounting cones, and with a control panel 7 comprising a display screen and a control panel.

The balancing machine is programmable and comprises several programs for measurement, standardization, accessory configuration, formatting and display, a specific program for static and dynamic processing of the different types of rims, as well as a program for optimization of mounting of the tire on the rim so as to reduce the weight of the balancing weights that are used.

The housing 1 has preferably a U-shaped configuration so as to support a device for the detection and measurement of position on the wheel.

Alternatively, the U shape of the frame 1 can be obtained by the pivoting about an axis, of a displaceable arm carrying the portion of the device according to the invention located opposite the console 7 relative to the wheel 3. Preferably, the portions of the frame or of the protective hood supporting the device are provided to ensure the retractability of the device, so as to avoid the projection of debris, gravel, water drops or other particles which can dirty or damage or impair the good operation of the device.

Referring to FIG. 2, a device for detection and measurement of position comprises elements disposed in fixed relation relative to a turning body 3 to be measured. In the case of an automotive vehicle wheel 3 adapted to be driven in rotation, the device comprises at least an illumination means 8 and at least one detector means 9 of luminous intensity. More precisely, the device comprises two illumination means 8, constituted each to provide a light beam comprised of substantially parallel rays with glancing incidence forming an angle A comprised between 20 and 35 degrees of arc with the mean plane of symmetry P of the wheel 3. Thus, each illumination means 8 is constituted by a housing 10 comprising a supply and control card 11 of a light source 12 of infra-red radiation or a halogen lamp, the light source 12 being disposed in the focal plane of a means 13 for creation of the beam 14 of parallel rays, of the type of a lens or the like. The beam 14 of parallel rays produced by the illumination means 8 is disposed in a glancing manner to illuminate a desired position such as an edge of the rim 15 which returns reflected light in the direction of the detector means 9 of luminous intensity.

Downstream of the edge of the rim 15 which reflects light with high intensity, a darkened zone 16 reflects practically no luminous intensity: there is thus created on the edge of the rim 15 and the space 16 a selective illumination which permits locating precisely the edge of the rim 15 thanks to the peak I of reflected luminous intensity which contrasts with the absence of reflected light in the darkened zone 16. Upstream of the edge of the rim 15, the beam 14 of parallel rays eventually strikes the lateral flank of the tire 3a, which reflects low intensity radiation, on which the peak of radiation reflected by the edge 15 is also reduced.

A device according to the invention thus provides a selective illumination forming into relief a position to be detected or to be measured, by producing adjacent or on this position to be detected and to be measured, a luminous energy peak which is detected as reflected radiation by detector means 9 of luminous intensity.

Thus, the selective illumination produced by the device according to the invention uses only a luminous intensity peak, contrary to the devices of the prior art which require picking up the curve of intersection of bidimentional laser planes or surfaces with the wheel rim and require at the same time the use of two-dimensional matrix detectors and the use of algorithms for complex computations, which are sources of systematic errors.

The luminous intensity peak can be a negative peak corresponding to a darker point position, a positive peak corresponding to a more brilliant point position, or a combination of a juxtaposed negative peak and positive peak called "high contrast". A luminous intensity peak can be produced directly or by reflection on a designated edge of an illuminated rim under an appropriate incidence.

Each detector means 9 of luminous intensity is constituted preferably by a chamber comprising an entry surface provided with a lens 17 or equivalent image definition means in its focal plane, in which may be disposed a linear optical detector 18, for example in optical detector of the CCD type or the like.

Such casings are analogous to the angular measurement device, particularly for the detection of the geometry of vehicles, described in U.S. patent application Ser. No. 08/320,242 of Oct. 11, 1994, which is incorporated herein by reference.

From a physical standpoint, the selective illumination produced by the device according to the invention creates at the position to be detected a source of lumious radiation which is geometrically localized by the detector means 9 of luminous intensity. By a triangulation calculation using the fixed distances separating two detector means 9 located on the same side of the plane P, there is determined the angle and distance of the geometric position of the location to be detected, such as an edge 15 of the rim.

By way of example, the distance separating two detector means 9 located on a same side, which distance defines one triangulation base, is comprised preferably between 30 and 400 mm, so as to detect the edges of the steel rims utilized at present.

Of course, the invention also covers the case of a plurality of illumination means 8 disposed sequentially so as to cover all the range of usual diameters of rims: preferably, the illumination means emits sequentially of the control of a program installed in the device so as to determine what is the mean illumination 8 which, for the wheel tested at this moment, supplies the illumination having the best selectively.

As illumination means 8 for the practice of the invention, there can be used alternatively a light source with a small conical opening or a substantially point light source disposed adjacent the position to be detected.

By way of example of light source for practicing the invention, can be cited electroluminescent diodes, halogen lamps, discontinuous lamps (called "flash lamps" by specialists) or any other equivalent sources adapted to supply selective illumination as described above.

Figure 3:
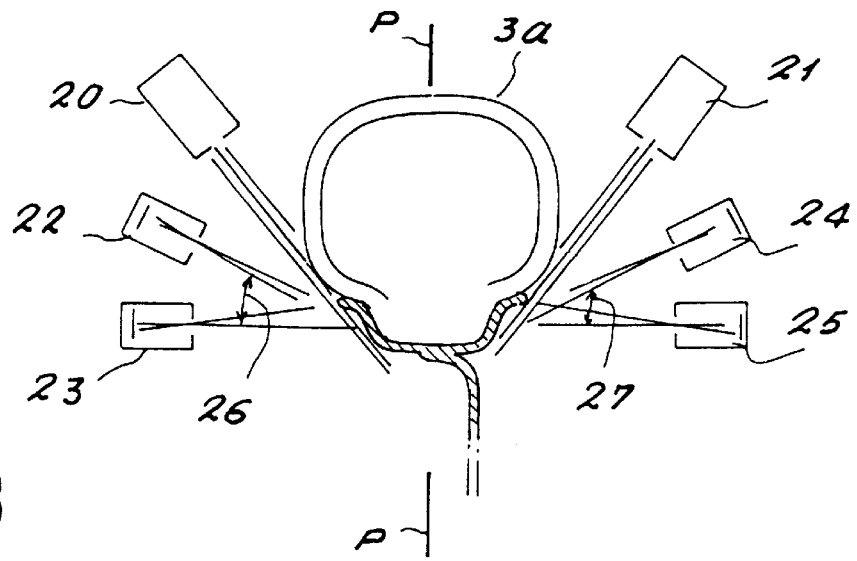
FIG. 3 shows schematically a simplified view in radial cross section of another device according to the invention.

With reference to FIG. 3, a polyvalent device according to the invention capable of detecting and measuring wheels comprising steel rims or light metal alloy rims, comprises on opposite sides of a median plane P two sources of luminous emission 20 and 21 fixed or displaceable in a predetermined manner and two pairs of detector means 22 to 25. The pair of detectors 22, 23 is associated with selective illumination means 20, whilst the pair of detectors 24 and 25 is associated with the selective illumination means 21. Preferably, the optical axis of a detector means 22 (respectively 24) forms with the optical axis of the other detector 23 (respectively 25) of the same pair, an angle 26 (respectively 27) of about 30°, so as to constitute a triangular base providing high precision of computation of the distances to be measured.

So as to eliminate defects, or the anomalies due to the contours of the tire 3a, it is preferable to cause the wheel 3 to turn at reduced speed during measurement. In this case, the emplacement of the detector is at a location defined by a curve substantially coaxial to the axis of rotation of the vehicle wheel. The device according to the invention contains preferably a program which effects the mean of the detected signals during rotation of the vehicle wheel and automatically eliminates the structural anomalies (contours of the tire, defects of molding, . . . ) by not taking account of measurement aberrations. Preferably, a correlation program verifies the reproducibility of the signals detected by the detector means 22 to 25 for one complete turn of the vehicle wheel.

This arrangement thus permits carrying out a control or an automatic display which supplies indications as to defects of the rim, to inadequate mounting of the wheel on the drive shaft, and to geometric faults inherent in the wheel itself (out-of-round or buckled).

In the use for balancing, the device according to the invention permits preferably, by measuring the position of the location of the valve, effecting an optimization program for the positioning of the tire on the rim thanks to a balancing operation of the rim itself by using coordinates relative to the position of the valve, then thanks to a balancing operation of the complete wheel comprising the rim and the tire mounted thereon by using the coordinates relating to the position of the valve determined in the preceding step. This program for optimizing mounting of the tire on the rim is thus effected thanks to the invention without a manual operation of marking or indexing between the rim and the tire.

Figure 4:
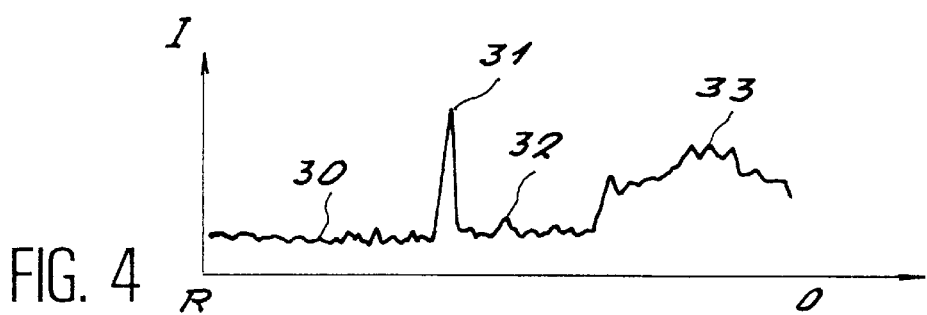
FIG. 4 shows schematically a typical curve of a measurement signal detected by a device according to the invention.

Referring to FIG. 4, a luminous intensity signal detected by luminous intensity detector means 9 or 22 to 25 is shown in the form of a curve representing the luminous intensity I detected by a detector means as above: a first portion 30 corresponds to the light reflected by the tire 3a, a luminous intensity peak 31 corresponds to the edge of the rim 15 or to the equivalent position to be detected, a second portion 32 corresponds to a darkened region or region of low light intensity, whilst a final portion 33 corresponds to the center of the wheel and to reflective zones bordering the securement holes of the rim. The curve I of luminous intensity is shown, from left to right, from a position corresponding to the maximum radius to the vicinity of the center of the wheel. When the wheel 3 is mounted substantially coaxially to the rotational drive shaft 2, the curves I of luminous intensity substantially overlie during each complete rotation of the wheel. The correlation to each rotation of the wheel is verified by the program forming a portion of the device according to the invention, which emits an error signal ox verification signal in the case of insufficient correlation.

Likewise, so as to eliminate irregularities or projections or indentations of the rim, the program contained in the device according to the invention effects the mean of the measurement curves I and eliminates aberrations corresponding to abrupt changes in the peak 31 of luminous intensity I.

Figure 5:
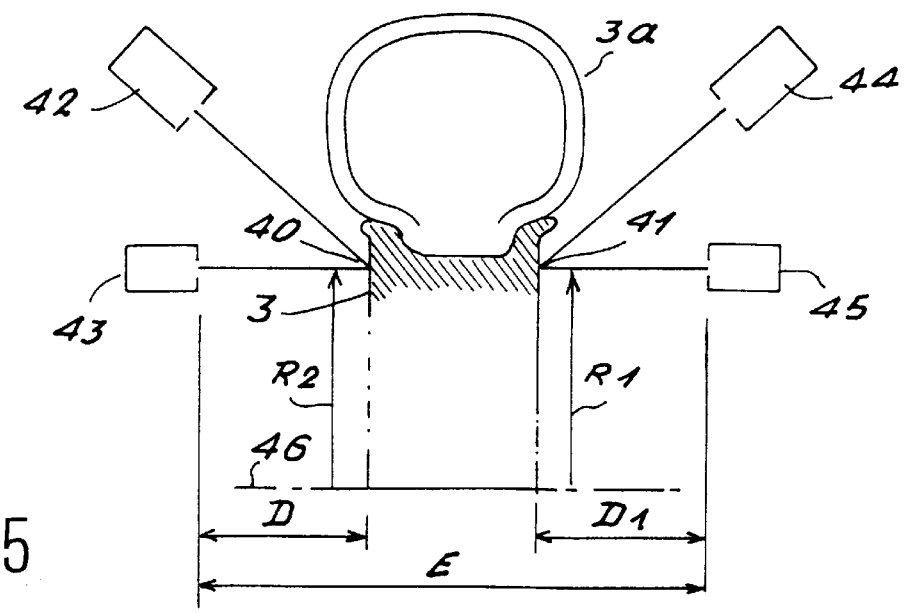
FIG. 5 is a geometric diagram explaining the measurements obtained by the invention.

Referring to FIG. 5, in another embodiment of the invention, there is created on a rim of light metal alloy comprising flat surfaces, an illumination adjacent a position to be detected by means of a substantially punctual light source disposed in immediate adjacency to the position to be detected. A source emitting toward a position 40 or 41 emits light rays which are detected by detector housings 42 to 45 disposed permanently at a known position; preferably, each pair 42 and 43 (44 and 45) is disposed in a radial plane passing through the axis of rotation 46 in a predetermined arrangement such that the optical axes of a pair of detector means 42 and 43 (44 and 45) define a geometric reference permitting locating the radius R corresponding to the luminous emission source 40 and the distance D separating the luminous emission source 40 from a predetermined reference plane corresponding for example to the input of a detector means 43.

In like manner, the source of luminous emission 41 is referenced for a radius R1 and a distance D1 relative to another predetermined reference plane. Knowing the spacing E of the two reference planes which are preferably parallel to each other, one can determine in a known manner, by simple geometric operations within the skill of those in the art, the geometric positions of the luminous emission sources 40 or 41 or of the positions located in immediate adjacency and in fixed relation relative to these point light sources 40 or 41.

Figure 6:
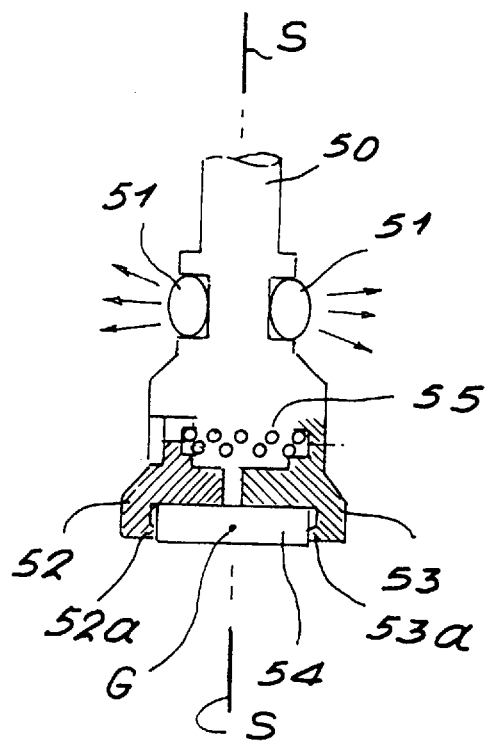
FIG. 6 is an enlarged schematic view partially cut away, of a tool for marking and positioning a weight, forming a portion of the device according to the invention.

Referring to FIG. 6, a substantially punctual source usable for a measurement process described with reference to FIG. 5 is constituted by a support 50 receiving an electroluminescent diode 51 or equivalent luminous emission means, and comprises in its lower portion a gripper with two jaws 52, 53 adapted to grasp a balancing weight 54, of the type to be cemented, utilizable in particular for balancing light alloy rims. The jaws 52 and 53 are subject to the action of a helical spring 55 so as to space them symmetrically apart, such that the center of gravity G of the weight 54 will always be located on the axis of symmetry S of the tool, no matter what the spacing of the jaws 52 and 53. Preferably, at least one jaw 52 or 53 carries marking means 52a or 53a for the rim, defining in the course of rotation of the wheel a marking line of the position of the weight assuring supplemental verification of the good positioning of the balancing weight before finally securing the latter. The marking means can be constituted by a marking ball, a colored pad or another means for carrying a disappearing or biodegradable ink, an ink jet, a powder jet or a chalk marker.

According to a desirable modification (not shown), the light emission source 51 can be constituted by a dummy balancing weight preferably made with the same dimensions as the weight 54, so as to mark exactly the position of the balancing weight before final securement of this latter. To this end, the gripper comprising two jaws 52 or 53 can be constituted so as to close an electric contact giving rise to luminous emission from the electroluminescent weight during its gripping.

The tool described with reference to FIG. 6 can contain energy storage means of the battery or rechargeable electric battery type or alternatively can be connected to an electrical supply adapted to supply the luminous emission source 51. In this desirable modification, the device according to the invention carries out first of all a preliminary computation to estimate the order of magnitude and the position of the required balancing weights, and then indicates to the operator the size of the luminous emission mass to be used as a function of the available balancing radius or radii.

Figure 7:
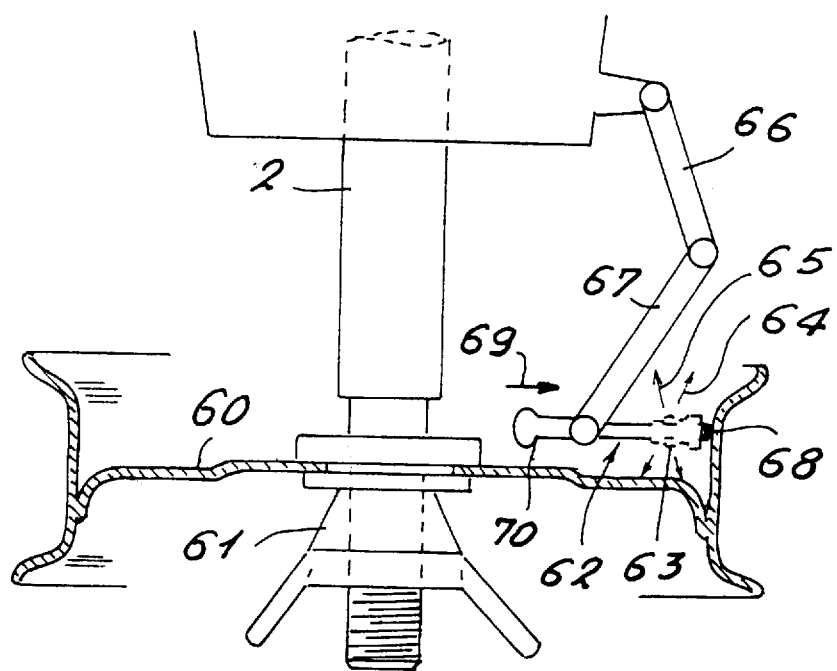
FIG. 7 shows schematically in a cross-sectional view in a horizontal plane, a balancing machine according to the invention provided with a tool for marking and positioning analogous to the tool of FIG. 6.

Referring to FIG. 7, a balancing machine according to the invention comprises a rotatable drive shaft 2, on which is secured a rim 60 by means of cone mounting 61. The machine is shown in cross section in a substantially horizontal diametral plane. A tool 62 comprising a luminous emission source 63 emitting two rays 64 and 65 to be detected, is secured at the end of a mechanical mounting with two levers 66 and 67 at the moment of securement of the weight 68 cemented on a cylindrical surface of the rim 60. The cylindrical mass to be cemented is secured by pressing in the direction of the arrow 69 on the orientable handle 70 disposed at the end of the second lever 67.

Preferably, the pressure in the direction of the arrow 69 is exerted by a pivotal movement about one or several vertical axes, which movement corresponds to the best ergonomic position for the operator. The gripping and the final securement of the balancing weight cemented on the internal surface of the rim is obtained after maintenance for one or several minutes without fatigue for the operator.

The invention described with reference to particular embodiments is not thereby limited, but covers on the contrary any modification of shape and all modifications of embodiment within the scope and spirit of the invention. Thus, the device used preferably as forming an integral portion of a balancing machine for a turning body, could also be used in a general manner for the geometric control of turning bodies without departing from the scope of the present invention.

What is claimed is:

1. In a device for the detection and measurement of a position on a turning body mounted on a balancing machine having means for driving the turning body into rotation about an axis of rotation, the device comprising in combination illumination means and at least one means for detecting luminous intensity receiving radiation from an illuminated position, the improvement wherein said illumination means include means for providing a light beam of substantially parallel rays with glancing incidence and the detector means of luminous intensity include a chamber comprising an inlet surface provided with means for defining an image on a linear optical CCD detector receiving radiation from the illuminated position, so as to detect a luminous intensity peak in order to determine a geometric parameter representative of the position to be detected, and said device further comprising means for withdrawing the illumination means and detection means of the luminous intensity, to avoid projection of debris.

2. Device according to claim 1, wherein said device has a U-shaped configuration at least partially surrounding the turning body, and wherein each branch of the U-shaped configuration carries a portion of the device.

3. Device according to claim 1, wherein the device is programmable and comprises a program comprising the following steps:

a) detecting a luminous intensity peak produced by said illumination means by using said detector means;

b) locating the position of said luminous intensity peak, and calculating said position by a triangulation calculation using fixed predetermined distances defining a triangulation base;

c) rotating the turning body at reduced speed during measurement, and memorizing the emplacement of the detector means relative to said calculated position for obtaining a curve substantially coaxial to the axis of rotation of the turning body;

d) effecting the mean of said calculated positions during rotation of the turning body; and e) eliminating measurement aberrations due to structural anomalies of the turning body.

4. Device according to claim 3, wherein the program further comprises the steps of:

correlating said calculated positions during rotation of the turning body for at least one complete turn; and verifying the reproducibility of signals corresponding to said calculated positions during at least one rotation of the turning body.

5. Programmable wheel balancing machine comprising a device according to claim 3, wherein the program further comprises the steps of:

measuring the position of the location of a valve of a wheel to be balanced, said wheel comprising a rim and a tire mounted thereon;

determining the balancing parameters of the rim itself by using coordinates relative to said measured position of the location of the valve;

determining the balancing parameters of the complete wheel comprising rim and tire mounted thereon by using coordinates relative to said measured position of the location of the valve;

calculating an optimized positioning of the tire on the rim so as to reduce the mass of balancing weights to be fixed;

mounting the tire on the rim according to said calculated optimized positioning, and affixing the balancing weights to the wheel.

* * * * *